No. 710,681. Patented Oct. 7, 1902.
C. GROTHE.
CULINARY VESSEL.
(Application filed Apr. 24, 1902.)
(No Model.)
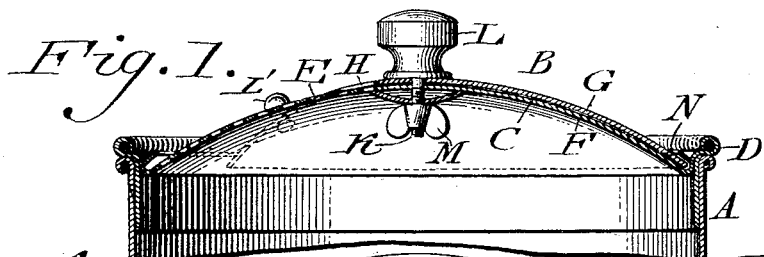
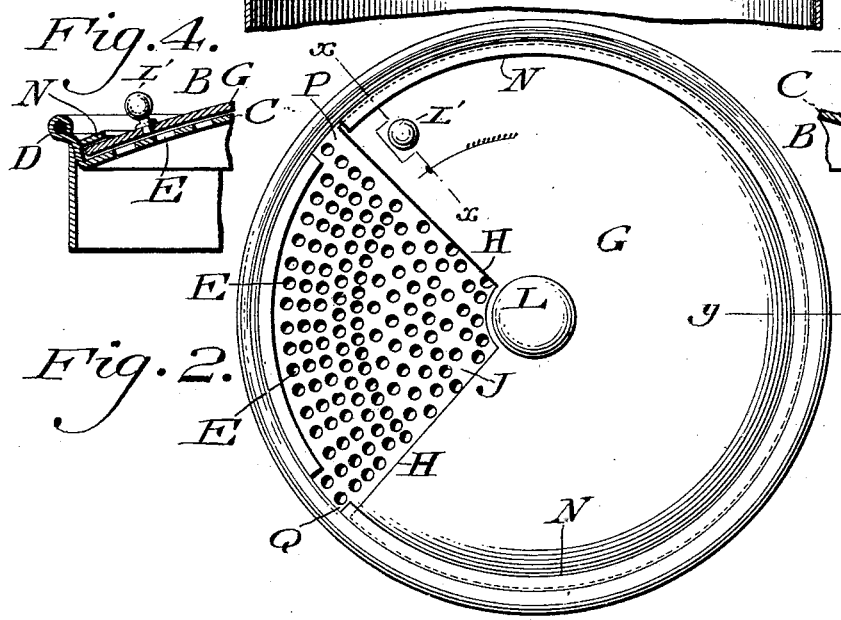
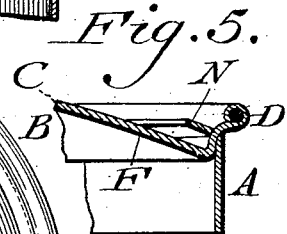
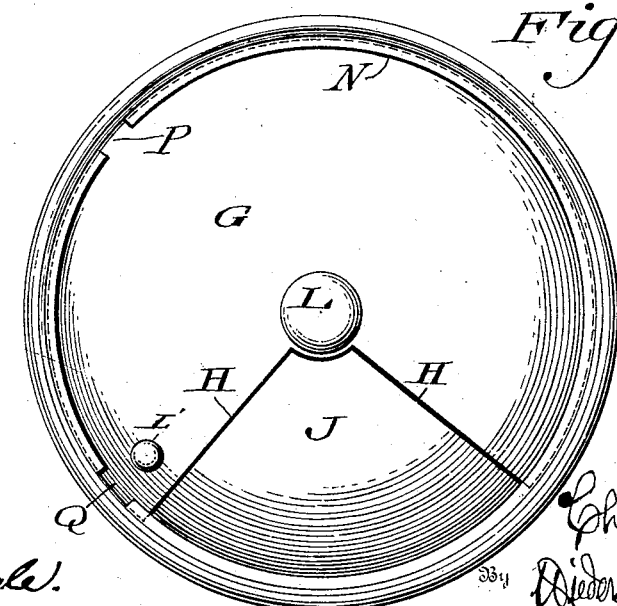
Witnesses
P. F. Nagle.
L. Douville.
Inventor
Charles Grothe.
by Diederscheim & Fairbanks
Attorneys
THE NORRIS PETERS CO., PHOTO-LITHO., WASHINGTON, D. C.

UNITED STATES PATENT OFFICE.

CHARLES GROTHE, OF PHILADELPHIA, PENNSYLVANIA.

CULINARY VESSEL.

SPECIFICATION forming part of Letters Patent No. 710,681, dated October 7, 1902.

Application filed April 24, 1902. Serial No. 104,460. (No model.)

*To all whom it may concern:*

Be it known that I, CHARLES GROTHE, a citizen of the United States, residing in the city and county of Philadelphia, State of Pennsylvania, have invented new and useful Improvements in Culinary Vessels, of which the following is a specification.

My invention relates to a culinary vessel adapted to drain the contents of the same without removing the lid, the object of the invention being the prevention of the escape of the steam at the top rim of the lid during the draining operation, excepting at the place of drainage, means for discharging the water that may enter the rim, and means for tightening the members of the lid.

To this end the invention consists of details of construction which will be hereinafter described and the novel features pointed out in claims.

Figure 1 represents a vertical section of a portion of a culinary vessel embodying my invention. Figs. 2 and 3 represent top or plan views thereof. Fig. 4 represents a vertical section of a portion on line $x$ $x$, Fig. 2. Fig. 5 represents a vertical section of a portion on line $y$ $y$, Fig. 2, omitting the upper member of the lid of the vessel.

Similar letters of reference indicate corresponding parts in the figures.

Referring to the drawings, A designates a portion of the body of a culinary vessel of the order of a domestic boiler or steamer, and B designates the lid thereof. The lid has two top walls, the lower wall C, which is connected with the rim D of the lid and having therein in one portion of the same a series of openings or open-work, as at E, the remaining portion F being solid. The upper wall G rests rotatively on the inner wall C and is solid excepting at the portion H, where it is cut away, forming an opening J, which at proper times uncovers the openings E.

In order to connect the walls C and G, I employ the screw K, which is passed freely through the centers of the same and has on its outer end the knob L as a shoulder and handle and on its inner end the nut M, by which provision said walls may be adjustably tightened on each other, and an axis is provided for the upper wall G. As said screw passes freely through the centers of the walls C and G, it will be noticed that the rotation of the upper wall G is not accomplished by the operation of the knob L, but by that of the thumb or finger piece L' on said plate, by which provision the adjustment of the friction or closeness of the joint between said walls is not disturbed.

N designates a circular flange which is secured to the inner periphery of the rim D and projects inwardly therefrom, so as to circumscribe the peripheral portion of the upper or outer walls and overhanging the outer edge of said wall, thus retaining the peripheral portion of said wall G close to the adjacent portion of the inner wall and covering the joint between the two walls. The flange is cut away at places P and Q adjacent to the openings E in the inner wall C for purposes to be hereinafter explained. Said flange, however, is continuous excepting at said places P and Q.

The operation is as follows: During steaming or cooking of the article within the body A the wall G is turned so as to cover the openings E, thus retaining the steam and heat within said body. When it is desired to drain the vessel, the wall G is turned from the position shown in Fig. 3 to that shown in Fig. 2, whereby the openings E are uncovered. Then the vessel may be tilted or overturned and the water in the body poured out through the openings E. Owing to the circumscribing nature of the flange N over the peripheral portion of the wall G steam and heat are prevented from directly escaping at the joint between the two walls and scalding or burning the holder of the vessel. In the tilted or overturned condition of the vessel water may enter the flange N between the openings P and Q, in which case by properly turning the vessel sidewise said water may escape through either of said openings P Q as a pour-off. It is evident that during the cooking or steaming operation should there be an excess of steam or heat within the vessel the same may be relieved by uncovering the openings E. When the nut M is removed, the screw K may be withdrawn, thus releasing the top wall or plate G, so that the latter may be raised clear of the plate C, and both plates are in condition to be cleansed, especially where their faces have been contiguous.

Various changes may be made in the details of construction without departing from the general spirit of my invention, and I do not desire, therefore, to be limited in each case to the same.

Having thus described my invention, what I claim as new, and desire to secure by Letters Patent, is—

1. In a culinary vessel, a lid having its top formed of two walls, one wall being partly solid and partly perforated, and the other wall partly solid and partly cut away, and a flange on the lower wall, said flange being continued inwardly from the periphery of said lower wall and overhanging the peripheral portion of the upper wall.

2. In a culinary vessel, a lid having a top formed of two members, the lower one of which is stationarily connected with the rim of said lid and the upper one is rotatable on said stationary wall, each of said walls being partly solid and partly perforated, a thumb-piece on the rotatable wall, and a screw which is passed freely through the centers of the two walls and means for tightening said walls on said screw, said screw forming the axis of the rotatable wall without capability of turning the same.

3. In a culinary vessel, a lid formed of a rim, a stationary wall connected therewith and a rotatable wall above said stationary wall, both walls being partly solid and partly open and a flange extending inwardly from said rim and overhanging the peripheral portion of the upper wall and covering the joint of the two walls, said flange having a pour-off opening therein.

CHARLES GROTHE.

Witnesses:
JOHN A. WIEDERSHEIM,
C. D. McVAY.